(12) United States Patent
Sakai

(10) Patent No.: US 7,049,959 B2
(45) Date of Patent: May 23, 2006

(54) POWERLESS TYPE SECURITY DEVICE

(75) Inventor: Yasuhiro Sakai, Tokyo (JP)

(73) Assignee: USC Corporation, Tokyo (JP)

(*) Notice: Subject to any disclaimer, the term of this patent is extended or adjusted under 35 U.S.C. 154(b) by 88 days.

(21) Appl. No.: 10/501,912

(22) PCT Filed: Feb. 24, 2004

(86) PCT No.: PCT/JP2004/002100

§ 371 (c)(1),
(2), (4) Date: Jul. 26, 2004

(87) PCT Pub. No.: WO2004/077653

PCT Pub. Date: Sep. 10, 2004

(65) Prior Publication Data

US 2005/0088310 A1 Apr. 28, 2005

(30) Foreign Application Priority Data

| Feb. 26, 2003 | (JP) | ............................ 2003-048903 |
| Jun. 18, 2003 | (JP) | ............................ 2003-172778 |
| Jul. 11, 2003 | (JP) | ............................ 2003-273595 |

(51) Int. Cl.
*G08B 13/08* (2006.01)

(52) U.S. Cl. ............... 340/545.5; 340/541; 340/384.6; 310/328; 310/339

(58) Field of Classification Search ............ 340/384.6, 340/541, 545.4, 545.5, 566; 310/323.01, 310/328, 331, 339
See application file for complete search history.

(56) References Cited

U.S. PATENT DOCUMENTS 4,672,257 A * 6/1987 Oota et al. .................. 310/328
6,166,624 A * 12/2000 Hurst ....................... 340/384.6
6,288,475 B1 * 9/2001 Ito et al. ................. 310/323.01
6,411,016 B1   6/2002 Umeda et al. .............. 310/339

FOREIGN PATENT DOCUMENTS

| JP | 06-76894   | 10/1994 |
| JP | 8-140369   | 5/1996  |
| JP | 09-182465  | 7/1997  |
| JP | 10-222773  | 8/1998  |
| JP | 10-229684  | 8/1998  |
| JP | 2001-145375| 5/2001  |
| WO | 01/08116   | 2/2001  |
| WO | 01/37417   | 5/2001  |

OTHER PUBLICATIONS

A copy of the International Search Report for corresponding international patent application No. PCT/JP2004/002100, dated Apr. 20, 2004. (Citing documents AD-AJ.).

* cited by examiner

*Primary Examiner*—Van T. Trieu
(74) *Attorney, Agent, or Firm*—Armstrong, Kratz, Quintos, Hanson & Brooks, LLP

(57) ABSTRACT

The present invention provides a non-power source type monitor device installed in a place where a non-power source system needs to be used or a place preferably suitable for the non-power source system, in which a quantity generated energy not lower than several ten times as much as an output of electric current obtained by usual piezoelectric power generating device using steel balls can be assuredly obtained by striking a piezoelectric ceramics element once. A piezoelectric power generating device is formed commonly with capable of automatically repeatedly striking the piezoelectric ceramics element so that a quantity of generated energy of a practical level can be assuredly ensured as a power source of such type monitor device.

7 Claims, 8 Drawing Sheets

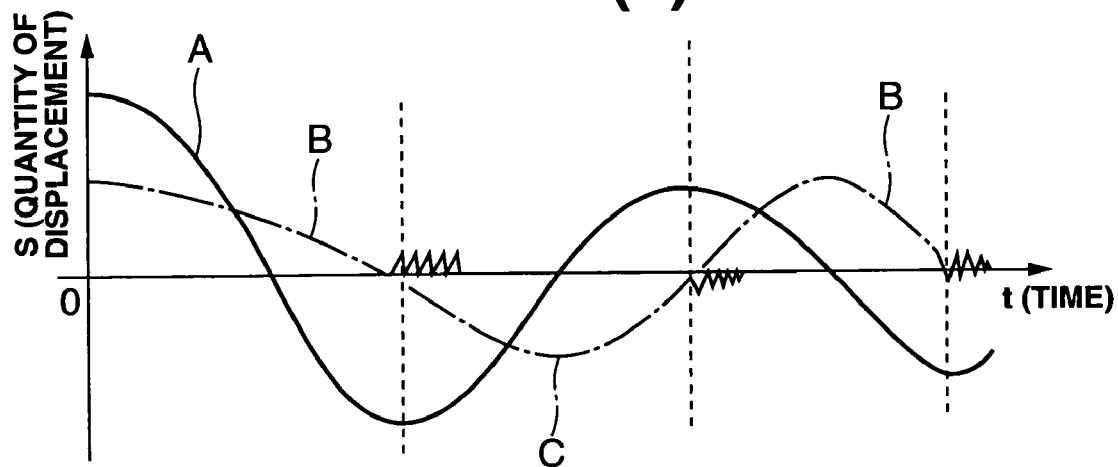
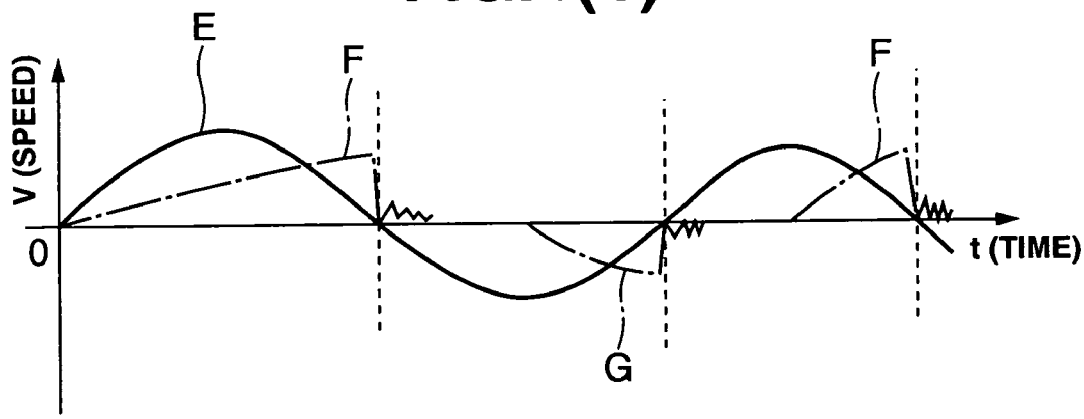

POWERLESS TYPE SECURITY DEVICE

TECHNICAL FIELD

The present invention relates to a non-power source type security device that can detect without a power source whether the door or the window of a building is opened or closed, whether a person enters or leaves from the building or a room and whether a vehicle is parked in or leaves from a parking place by the use of a piezoelectric power generating device using a piezoelectric ceramics element.

BACKGROUND ART

Most of usual security devices attached to the window or the door of a building are ordinarily attached afterward to the lock part of the window or the door. These security devices are easily externally detected and the operations thereof can be intentionally stopped by breaking glass or the door.

Further, in such usual security devices, the wiring of a power source for operation needs to be attached afterward. When the usual security devices are attached to all the windows or the doors of one house, a facility cost or a construction cost is extremely increased. In addition thereto, power always needs to be supplied to all the security devices. Thus, a running cost is undesirably increased.

Still further, in the usual security device, a plurality of the same kinds of devices needs to be attached, so that a specific opening or closing position is hardly instantaneously decided. Further, since the usual security device functions as a single member, the usual security device is hardly combined with other security system. Accordingly, the usual security device has great many problems to be solved in practice.

The above-described problems are common to those of a monitor device for monitoring the entrance to or exit from the building or the room, or a device for monitoring a parking or leaving state in a parking place.

As means for solving the above-described problems, a method may be considered by which each of the above-described states can be monitored under a non-power source state by making use of a piezoelectric power generating device using a piezoelectric ceramics element.

A piezoelectric material has various application aspects as a converting element between mechanical energy and electrical energy. As materials showing a piezoelectric effect, many materials of both inorganic materials and organic materials are well-known. As materials that are currently put to practical use, materials such as a PZT type ceramics (piezoelectric ceramics) are exemplified.

The piezoelectric ceramics element is an element provided with piezoelectric characteristics formed in such a way that high D.C voltage is applied to a polycrystalline material to generate remanence. Since a basic piezoelectric constant can be relatively freely changed depending on the composition of the piezoelectric ceramics element, a use thereof is wide. Especially, the piezoelectric ceramic element composed of lead zirconate titanate (PZT) has a wide selection range of composition ratio or additives and a variety of application ranges.

The usual piezoelectric power generating device using the piezoelectric ceramics element is formed by uniting a piezoelectric ceramics element plate to a base made of an acrylic material and fixing both the end parts of the base by holders made of a hard material such as metal. Then, steel balls are dropped on the ceramics element plate to apply mechanical impact energy due to a collision to the piezoelectric element plate, excite a flexural oscillation on the piezoelectric element plate including the base and take out electric energy.

However, although the practicability of the usual PZT type piezoelectric ceramics element is anticipated, a quantity of generated energy is very small. Thus, the usual PZT type piezoelectric ceramics element is undesirably deficient in its practicability. This problem arises, because the piezoelectric power generating device using the piezoelectric ceramics element of this type has important factors, for instance, the natural oscillation of the piezoelectric ceramics plate essentially needs to be continued as long as possible and how a strong and effective impact force is applied to the piezoelectric ceramics element.

However, most of the usual piezoelectric power generating devices do not have a support structure that the natural oscillation of the piezoelectric ceramics element plate does not accompany a mechanical resistance and a structure that the impact force to the piezoelectric ceramics element is still applied by steel balls as disclosed in, for instance, Japanese Patent Application Laid-Open No. 2001-145375. When an adequate quantity of generated energy is to be obtained in the structure using the steel balls, under these circumstances, there is no means other than a method that many steel balls are allowed to collide with the piezoelectric ceramics element as many as possible.

With the above-described circumstances taken into consideration, the present invention is devised. It is an object of the present invention to provide a non-power source type monitor device installed in a place where a non-power source system needs to be used or a place preferably suitable for the non-power source system, in which a quantity of generated energy not lower than several ten times as much as an output of electric current obtained by the usual piezoelectric power generating device using the steel balls can be assuredly obtained by striking a piezoelectric ceramics element once and a piezoelectric power generating device is formed commonly with means capable of automatically repeatedly striking the piezoelectric ceramics element so that a quantity of generated energy of a practical level can be assuredly ensured as a power source of such type of monitor device.

DISCLOSURE OF THE INVENTION

In order to achieve the above-described objects, the invention defined in claim 1 concerns a non-power source type monitor device in a non-power source type security device in which a power of the security device for monitoring whether the door or the window of a building is opened or closed, whether a person enters or exits from a building or a room, or whether a vehicle parks in or leaves from a parking place is supplied by a piezoelectric power generating device using a piezoelectric ceramics member. The piezoelectric power generating device generates power by applying a distortion deformation to the piezoelectric ceramics member. The piezoelectric power generating device comprises: a pair of piezoelectric ceramics members; a cushion material for holding each of the piezoelectric ceramics members under a soft state in which the natural oscillation of each piezoelectric ceramics member is hardly transmitted to other structural members; a pendulum member oscillating through one elastic member in accordance with an excitation; a pair of the other elastic members fixed to both the ends of the one elastic member and extending in a direction perpendicular to the one elastic member; and hard striking members respectively fixed to the end parts of the pair of the other elastic members to alternately strike the pair of the piezoelectric ceramics members and apply an impact respectively to the piezoelectric ceramics members. During the oscillation of the pendulum member, a striking operation that one striking member of the pair of the striking members strikes one piezoelectric ceramics member of the pair of the piezoelectric ceramics members and a separating operation that the other striking member of the pair of the striking members is separated from the other piezoelectric ceramics member of the pair of the piezoelectric ceramics members are continuously alternately repeated to continuously generate power.

The invention defined in claim 2 according to the non-power source type monitor device defined in claim 1 as a technical precondition is characterized in that the one elastic member is made of a rectangular plate shaped leaf spring or a coil spring and the pair of the other elastic members is made of a cylindrical rod spring, a rectangular leaf spring or a coil spring.

The invention defined in claim 3 according to the non-power source type monitor device defined in claim 2 as a technical precondition is characterized in that during the oscillation of the pendulum member, the pair of the other elastic members forms an intermittent mechanism for continuously alternately repeating the striking operation and the separating operation of each striking member relative to each piezoelectric ceramics member.

The invention defined in claim 4 concerns a non-power source type monitor device in a non-power source type security device in which a power of the security device for monitoring whether the door or the window of a building is opened or closed, whether a person enters or exits from a building or a room, or whether a vehicle parks in or leaves from a parking place is supplied by a piezoelectric power generating device using a piezoelectric ceramics member. The piezoelectric power generating device generates power by applying a distortion deformation to the piezoelectric ceramics member. The piezoelectric power generating device comprises: at least one piezoelectric ceramics member; a cushion material for holding the piezoelectric ceramics member under a soft state in which the natural oscillation of the piezoelectric ceramics member is hardly transmitted to other structural members; a base member made of a spring material; a pair of elastic members fixed to a vertical part of the base member; and hard striking members respectively fixed to both the end parts of the pair of the elastic members to strike the piezoelectric ceramics member and apply an impact to the piezoelectric ceramic member. An external force is exerted on one of the striking members so that the other striking member continuously repeats a vertical oscillation due to a resonance operation.

The invention defined in claim 5 according to the non-power source type monitor device defined in claim 4 as a technical precondition is characterized in that the pair of the elastic members has the same length from the base member and is fixed to the base member and the striking members fixed to both the end parts of the base member have substantially the same form and weight.

The invention defined in claim 6 according to the non-power source type monitor device defined in either claim 4 or claim 5 as a technical precondition is characterized in that the pair of the elastic members are connected integrally to the base member by using any of means of screwing, caulking, an adhesive or welding.

BRIEF DESCRIPTION OF THE DRAWINGS

FIG. 4(*a*) is a waveform diagram showing an amount of displacement of a pendulum member and a pair of striking members of the piezoelectric power generating device, and FIG. 4(*b*) is a waveform diagram showing the speed of the pendulum member and the pair of the striking members.

BEST MODE FOR CARRYING OUT THE INVENTION

Now, embodiments of the present invention will be described in detail by using the accompanying drawings.

Figure 1:
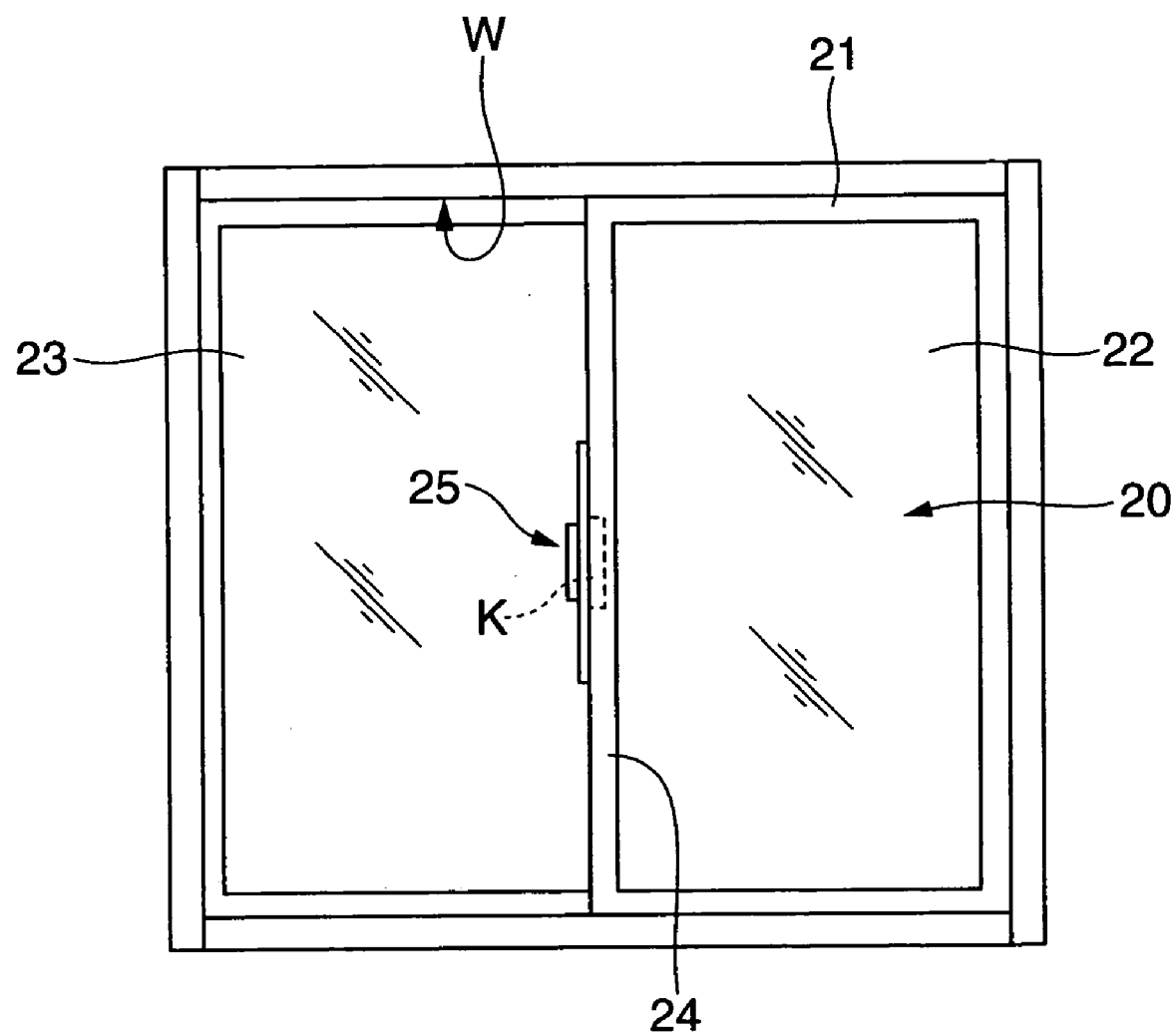
FIG. 1 is a front explanatory view showing the attaching state of a sliding door to which a monitor device according to the present invention is attached.

FIG. 1 shows a first embodiment of the present invention. The first embodiment shows a case that a monitor device K of the present invention is attached to a window 20 made of an aluminum sash as an opening and closing member mounted on a window opening W of a building.

In a basic form of the window 20 according to the first embodiment, two sliding doors 22 and 23 are fitted to a substantially square shaped window frame 21 made of an aluminum sash as a frame fixed to the building so as to freely slide in a mirror-image manner. A crescent lock 25 provided with the monitor device K is arranged on an inner vertical frame part 24 of the sliding door 22 so as to be detachably engaged with an engaging member (not shown) disposed in the other sliding door 23. The monitor device K is provided to operate interlocking with the opening and closing operation of the window 20 to detect the opening and closing operations of the window 20.

Figure 2:
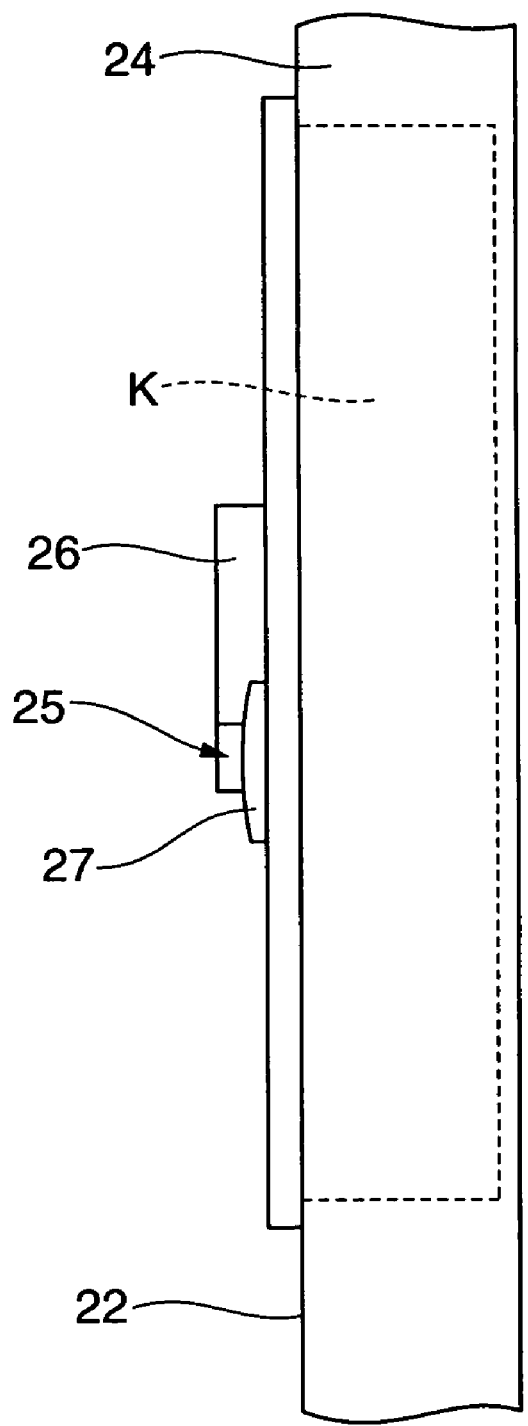
FIG. 2 is a structural explanatory view showing the structure of a crescent lock in which the monitor device is incorporated.

The basic structure of the crescent lock 25 includes, as shown in FIG. 2, an operating lever part 26 and a substantially semicircular engaging part 27 connected to the operating lever part 26 and held to freely rotate on a shaft as a center of rotation. The engaging part 27 is rotated by holding the operating lever part 26 to engage the engaging part 27 with the engaging member attached to the other sliding door 23.

Figure 3:
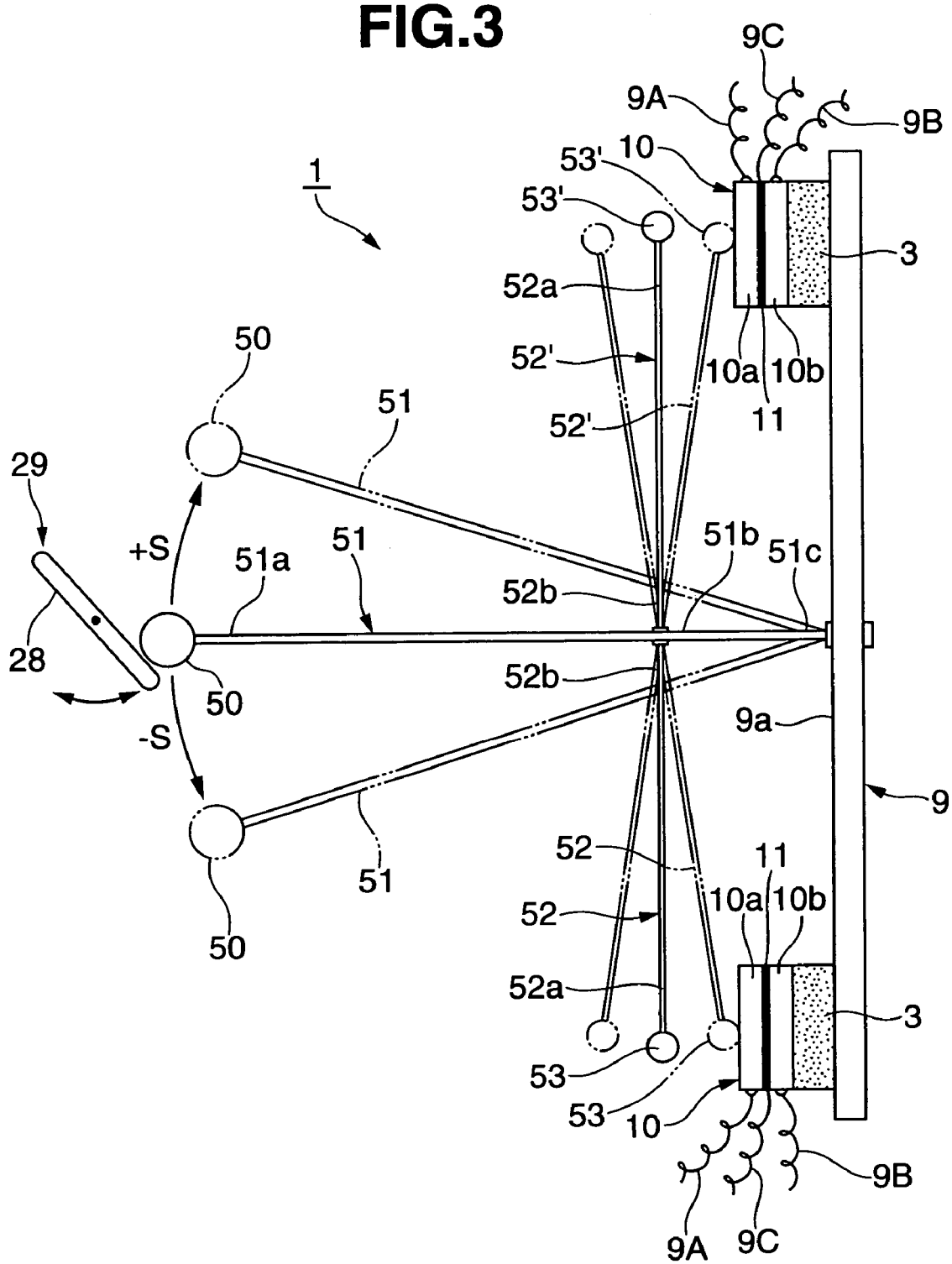
FIG. 3 is a structural view showing a schematic structure of a piezoelectric power generating device incorporated in the monitor device.

In the first embodiment, in an inner side of the above-described shaft, an interlocking piece 29 is provided for pressing an operating member 28 shown in FIG. 3 in accordance with the rotating operation of the engaging part 27 of the crescent lock 25. The interlocking piece 29 presses the operating member 28 so that the other end part of the operating member 28 whose central part is supported rotates to press a below-described steel ball 50 of a piezoelectric power generating device 1 clockwise in FIG. 3. After the pressing operation by the interlocking piece 29 is completed, the operating member 28 is automatically returned to an original position by an urging force of a spring that is not illustrated. During the returning operation, the operating member 28 presses the steel ball 50 counterclockwise in FIG. 3.

On the other hand, the piezoelectric power generating device 1 comprises, as shown in FIG. 3, a frame 9 fixed to the inner vertical frame part 24 of the sliding door 22, a pair of piezoelectric ceramics members 10A and 10B disposed on both the upper and lower sides of an upper surface 9a of the frame 9, cushion materials 3 for holding the pair of the piezoelectric ceramics members 10A and 10B under a soft state in which the natural oscillation of each of the piezoelectric ceramics members 10A and 10B is hardly transmitted to other structural members, a spherical weight (a pendulum member) 50 oscillating through a rectangular plate shaped leaf spring 51 under an excitation, a pair of cylindrical rod springs 52 and 52' fixed to both the upper and lower sides of the leaf spring 51 and extending in a vertical direction perpendicular to the leaf spring 51 and steel balls (hard striking members) 53 and 53' respectively fixed to the end parts 52a of the pair of the rod springs 52 and 52' and serving as weights for alternately striking the piezoelectric ceramics members 10A and 10B to apply an impact to each of the piezoelectric ceramics members 10A and 10B.

The pair of the piezoelectric ceramics members 10A and 10B respectively includes two plate shaped piezoelectric ceramics elements 10a and 10b having the same material, the same form and the same thickness. The polarity of polarization of the piezoelectric ceramics elements 10a and 10b has the same direction. Between the piezoelectric ceramics elements 10a and 10b, an extremely thin metallic electrode 11 made of electrically conductive metal such as phosphor bronze or brass and having the thickness of 10 µm to 50 µm is disposed. Each of the piezoelectric ceramics members is formed by uniting the extremely thin metallic electrode 11 to the piezoelectric ceramics elements 10a and 10b.

Then, for instance, when the piezoelectric ceramics element 10a of one side expands, the piezoelectric ceramics element 10b of the other side contracts and the electrodes of output voltage are opposite to each other. Thus, in a power generation structure, both the piezoelectric ceramics elements 10a and 10b are connected in parallel with each other. That is, when the above-described flexural oscillation is generated, both the operations of expansion and contraction are carried out in one piezoelectric ceramics element 10a (or 10b), power is efficiently generated without canceling the polarization. Electric current as generated electric power energy is taken out by using lead wires 9A, 9B and 9C electrically connected to both the piezoelectric ceramics elements 10a and 10b and the metallic electrode 11.

Further, each cushion material 3 is made of a synthetic resin material, a rubber material or a soft material obtained by forming these materials in sponge. Only a central part or both the ends of the cushion material 3 are fixed to each of the piezoelectric ceramics members 10A and 10B by using an adhesive and fixed to the upper surface 9a of the frame 9. Thus, the oscillation of each of the piezoelectric ceramics members 10A and 10B is hardly damped as much as possible. Namely, when each of the piezoelectric ceramics members 10A and 10B oscillates, members for supporting each of the piezoelectric ceramics members 10A and 10B form factors for damping the oscillation of each of the piezoelectric ceramics members 10A and 10B. To remove the damping factors, the piezoelectric ceramics members 10A and 10B are respectively brought into free states as much as possible by using the cushion materials 3.

The distortion of each of the piezoelectric ceramics members 10A and 10B forms a natural oscillation of the piezoelectric ceramics itself and continues for a while. To continuously keep this natural oscillation for a long time, it is important not to transmit the natural oscillation to other components except each of the piezoelectric ceramics members 10A and 10B. The natural oscillation of each of the piezoelectric ceramics members 10A and 10B is converted to electric energy, however, the oscillation of other structural members are all forms a mechanical resistance to absorb natural oscillation energy so that the electric energy cannot be taken out. Therefore, as means for realizing a soft contact that the natural oscillation is not transmitted between each piezoelectric ceramics member 10 and other structural members, the above-described cushion materials 3 are used. Accordingly, the natural oscillation of each of the piezoelectric ceramics members 10A and 10B can be continued for a long time to improve power generation efficiency.

It is to be understood that the cushion materials 3 serve to mitigate an impact applied to the piezoelectric ceramics members 10A and 10B. A protector plate (not shown) may be fixed to the central part of the striking surface of each of the piezoelectric ceramics members 10A and 10B. The protector plate is made of metal, a synthetic resin or the like to protect each of the piezoelectric ceramics members 10A and 10B from the striking of each of the steel balls 53 and 53'.

The rectangular plate shaped leaf spring 51 has its lower end part 51c fixed to the frame 9 to be extended in the horizontal direction relative to the frame 9. The spherical weight 50 is fixed to an end part 51a of the leaf spring 51. To the central part of an intermediate part 51b in the lower end side of the leaf spring 51, base end parts 52b of the pair of the vertical rod springs 52 and 52' are respectively fixed. Thus, the pair of the rod springs 52 and 52' extends by an equal distance in the vertical direction perpendicular to the leaf spring 51. To the end parts 52a of the pair of the rod springs 52 and 52', the steel balls 53 and 53' serving as weights are respectively fixed.

As shown by arrow marks in FIG. 3, when the weight 50 or the leaf spring 51 are vertically excited so that the weight 50 oscillates vertically, a striking operation that one steel ball (one striking member) 53 of the pair of the steel balls 53 and 53' as the striking members strikes one piezoelectric ceramics member 10A (a lower side of FIG. 3) of the pair of the piezoelectric ceramics members 10A and 10B and a separating operation that the other steel ball 53' (the other striking member) of the pair of the steel balls 53 and 53' is separated from the other piezoelectric ceramics member 10B (an upper side of FIG. 3) of the pair of the piezoelectric ceramics members 10A and 10B are adapted to be alternately continuously repeated in the upper and lower parts. That is, during the oscillation of the weight 50, the pair of the rod springs 52 and 52' respectively forms an intermittent mechanism for continuously alternately repeating the striking operation and the separating operation of the steel balls 53 and 53' in the upper and lower parts relative to the piezoelectric ceramics members 10A and 10B.

In the continuously excited piezoelectric power generating device 1 constructed as described above, the pair of steel balls 53 and 53' strike the pair of the piezoelectric ceramics members 10A and 10B formed in plate shapes to apply a distortion deformation to the piezoelectric ceramics members. Thus, power is generated. That is, the weight 50 or the leaf spring 51 is excited once by the operating member 28 to oscillate the weight 50 upward and downward and store kinetic energy. Either one of the pair of the upper and lower rod springs 52 and 52' is alternately excited by the stored kinetic energy so that the steel balls 53 and 53' are respectively allowed to alternately, continuously and repeatedly strike the piezoelectric ceramics members 10A and 10B to generate power.

The relation between a quantity of displacement (a quantity of oscillation) of the weight 50 and the phase of a quantity of displacement of each of the steel balls 53 and 53' is shown in FIG. 4(*a*). The relation of speed (angular velocity) of the weight 50 and the phase of speed (exciting speed) of each of the steel balls 53 and 53' is shown in FIG. 4(*b*). In a waveform diagram of FIG. 4(*a*), the displacement of the weight 50 is shown by a full line A. The displacement of one steel ball 53 is shown by a dashed line B. The displacement of the other steel ball 53' is shown by a two-dot chain line C. In a waveform diagram of FIG. 4(*b*), the speed of the weight 50 is shown by a full line E. The speed of the one steel ball 53 is shown by a dashed line F and the speed of the other steel ball 53' is shown by a two-dot chain line G.

As can be understood from FIGS. 4(*a*) and 4(*b*), in the repeatedly excited oscillating type piezoelectric power generating device 1, the storage of the oscillating force (the kinetic energy) of the weight 50 is divided from a consumption due to the striking of the pair of the steel balls 53 and 53' to the piezoelectric ceramics members 10A and 10B so that a first order lag (a lag of about 90° in terms of phase is optimum) is provided between the movement of the weight 50 and the movement of each of the steel balls 53 and 53'. Thus, when the speed of the weight 50 is zero or low, the speed of one steel ball 53 or the other steel ball 53' can be set to a maximum value. Accordingly, the exciting speed of each of the steel balls 53 and 53' relative to each of the piezoelectric ceramics members 10A and 10B can be made maximum and the oscillation (vibration) of the weight 50 can be continuously repeated.

Further, during the oscillation of the weight 50, the pair of the rod springs 52 and 52' vertically fixed to the leaf spring 51 to which the weight 50 is fixed forms the intermittent mechanism (a first order lag mechanism) in which the steel balls 53 and 53' respectively alternately and continuously repeat the striking operation and the separating operation relative to the pair of the piezoelectric ceramics members 10A and 10B rightward and leftward. Accordingly, as compared with an excitation without the intermittent mechanism (namely, when the steel ball is fixed to only one side of the leaf spring 51), the striking operations of the steel balls 53 and 53' can be respectively alternately, continuously and repeatedly carried out by exciting the weight 50 once.

Upon excitation without the intermittent mechanism, when the weight 50 has speed, the speed reaches zero due to a sudden collision. Thus, the kinetic energy of one strike is high, however, a repeated movement cannot be obtained. However, in this embodiment, as shown in FIG. 4(*b*), the position of the maximum speed of each of the steel balls 53 and 53' is delayed from the position of the maximum speed of the weight 50 by the pair of the rod springs 52 and 52'. When the speed of the weight 50 is zero or low, the speed of one steel ball 53 or the other steel ball 53' is set to a maximum value so that each of the piezoelectric ceramics members 10A and 10B can be struck under a maximum striking value. Thus, a power generation efficiency not lower than several ten times as high as a usual power generation efficiency can be obtained. For instance, as a power of a security device for monitoring whether the door or the window of a building is opened or closed, whether a person enters or exits from a building or a room, or whether a vehicle parks in or leaves from a parking place, a quantity of generated energy of a practical level can be assuredly ensured. The oscillating type piezoelectric power generating device 1 is simple in its structure and can more economically obtain larger output current. Thus, the piezoelectric power generating device is practical.

As described above, during the oscillation of the weight 50, the striking operation that one steel ball 53 of the pair of the steel balls 53 and 53' strikes one piezoelectric ceramics member 10A of the pair of the piezoelectric ceramics members 10A and 10B and the separating operation that the other steel ball 53' of the pair of the steel balls 53 and 53' is separated from the other piezoelectric ceramics member 10B of the pair of the piezoelectric ceramics members 10A and 10B are adapted to be alternately continuously repeated in the upper and lower parts. Thus, a quantity of generated energy not lower than several ten times as high as a current output obtained in the usual piezoelectric power generating device using one steel ball can be more assuredly obtained by the striking operations of the steel balls 53 and 53' respectively alternately and continuously repeated under the excitation of the weight 50 for once.

Figure 5:
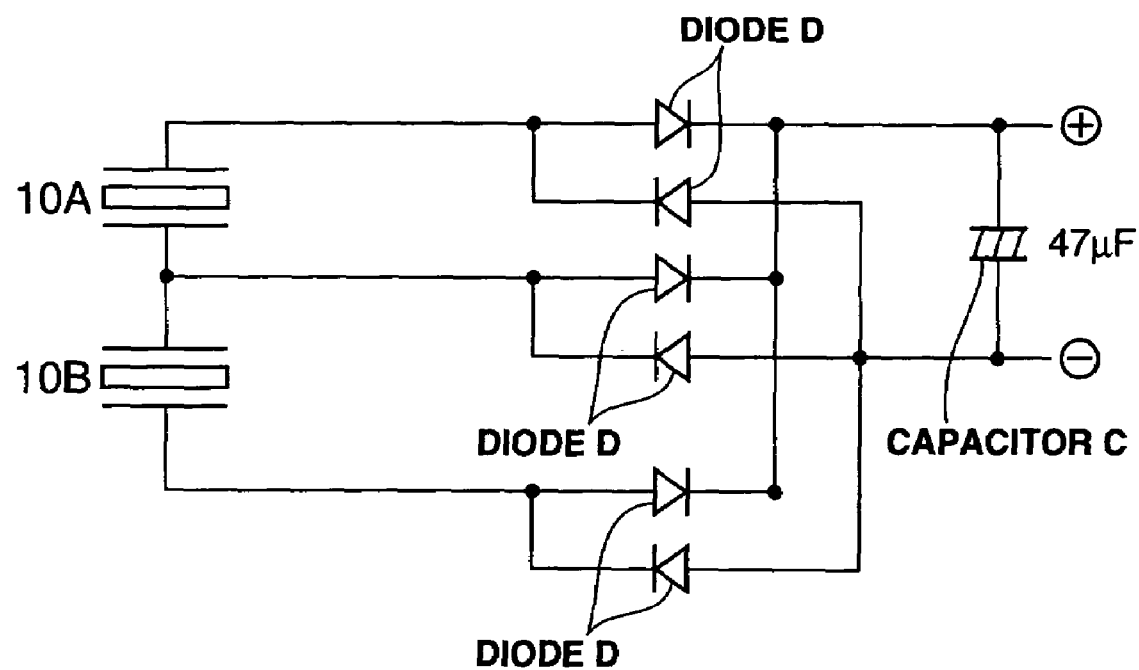
FIG. 5 is a diagram showing a circuit for measuring a quantity of generated energy by the piezoelectric power generating device.

Here, the weight 50 shown in FIG. 3 is formed with a steel ball of 6.3 g. The leaf spring 51 is formed with a spring steel having the width of 5 mm, the thickness of 0.4 mm and the length of 28 mm. The pair of the rod springs 52 and 52' is respectively formed with a piano wire having φ of 0.5 mm and the length of 20 mm. The pair of the steel balls 53 and 53' is respectively formed with a steel ball of 0.65 g. Further, the pair of the piezoelectric ceramics members 10A and 10B is respectively formed to 5.8 mm×17.5 mm×2 mm. The cushion material 3 is formed with foaming polyurethane having the thickness of 2 mm. Voltage was measured by a measuring device shown in FIG. 5. Results thereof are shown in FIG. 6.

Figure 6:
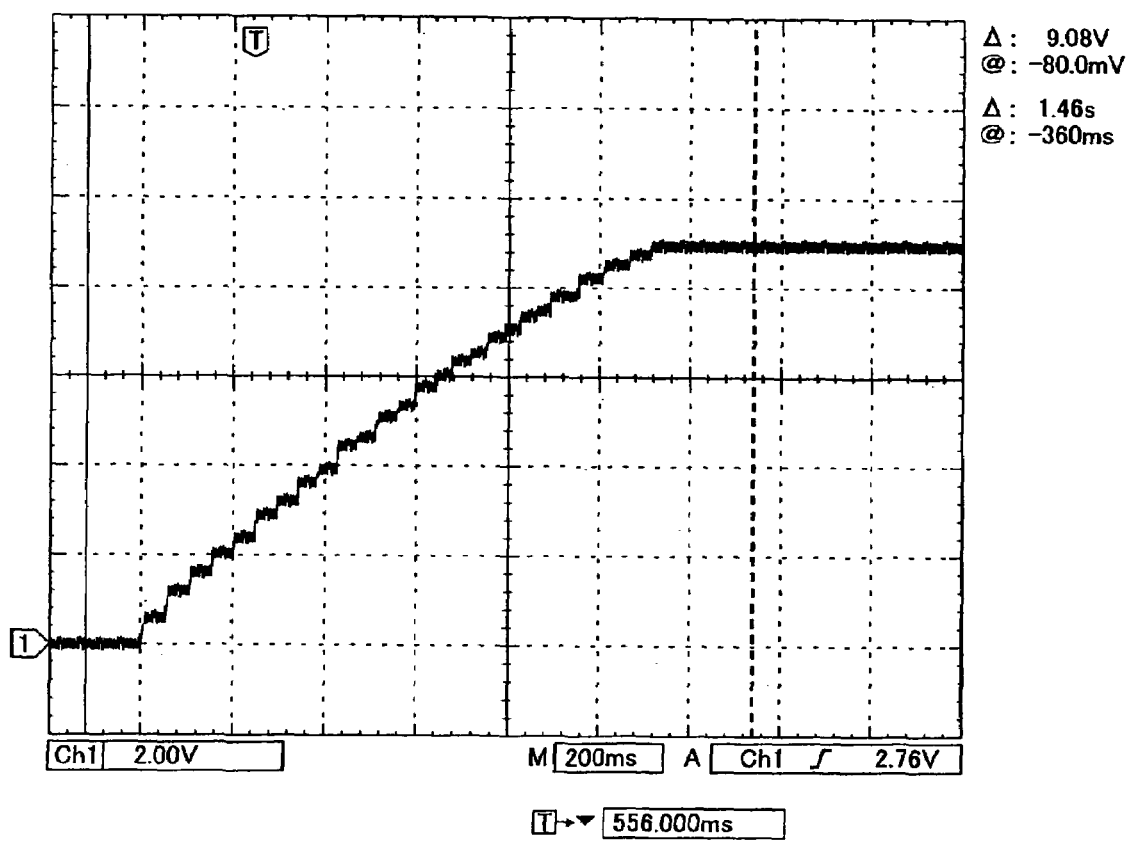
FIG. 6 is a graph showing the quantity of the generated energy of the piezoelectric power generating device measured by the measuring circuit.

As apparent from data shown in FIG. 6, when the weight 50 is excited once, the pair of the steel balls 53 and 53' alternately and continuously repeats the striking operations in the upper and lower parts without being damped. Thus, it is understood that a power generation not lower than several ten times as high as a quantity of generated energy obtained by a striking operation for only once as usual can be obtained.

Further, the rectangular plate shaped leaf spring 51 for oscillating the weight 50 as a pendulum member is used and the pair of the cylindrical rod springs 52 and 52' having the steel balls 53 and 53' as the striking members respectively fixed to the end parts 52*a* are used. Then, during the oscillation of the weight 50, the pair of the rod springs 52 and 52' forms the intermittent mechanism for alternately and continuously repeating the striking operation and the separating operation of the steel balls 53 and 53' relative to the pair of the piezoelectric ceramics members 10A and 10B in the upper and lower parts. Accordingly, the striking force of the steel balls 53 and 53' respectively relative to the pair of the piezoelectric ceramics members 10 and 10 can be alternately, continuously and repeatedly obtained in the upper and lower parts by a simple and inexpensive mechanism.

In the first embodiment, a case that the rectangular leaf spring 51 and the rod springs 52 and 52' are used to obtain the continuous oscillation is described as an example. However, the present invention is not limited thereto and the leaf spring 51 may be formed with a coil spring. Further, the pair of the cylindrical rod springs 52 and 52' may be formed with a rectangular leaf spring or a coil spring with the same effects.

Figure 7:
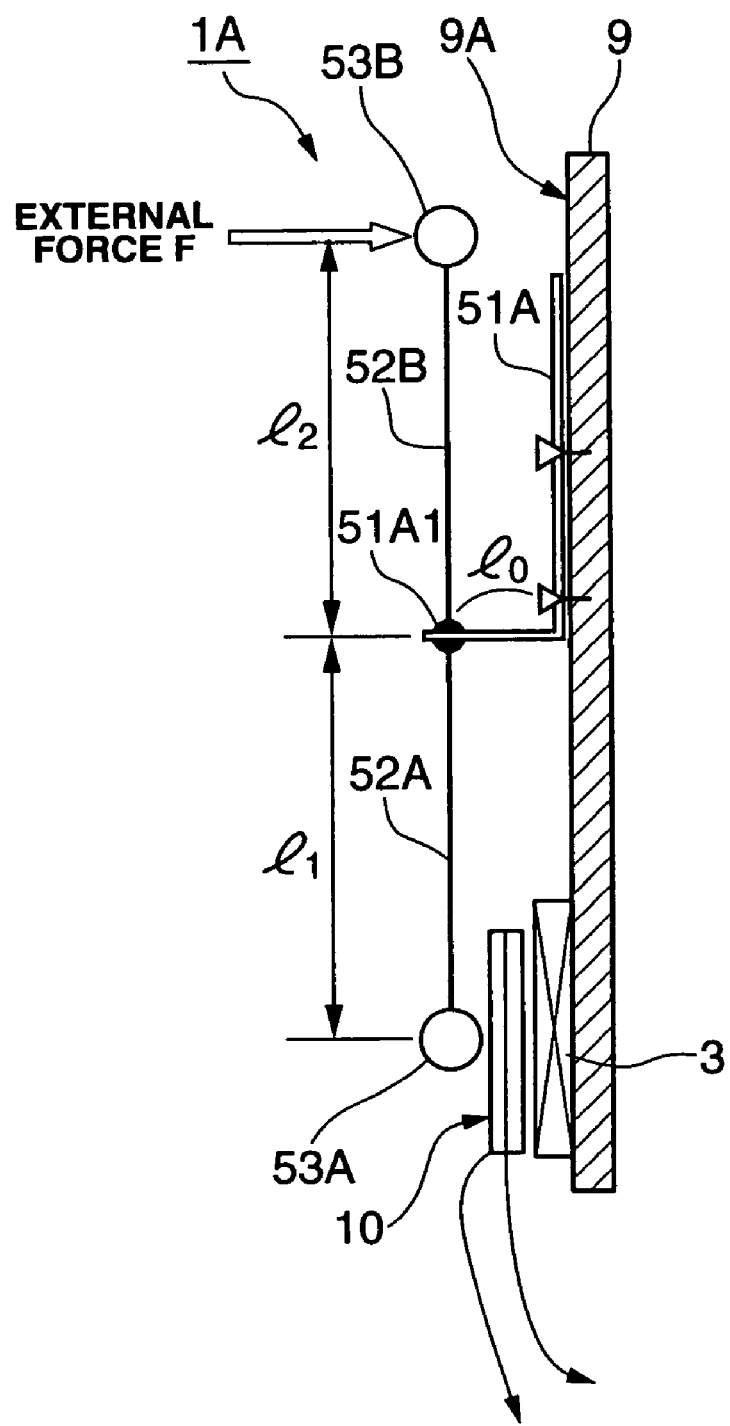
FIG. 7 is a structural view showing a schematic structure of another piezoelectric power generating device incorporated in the monitor device according to the present invention.

FIG. 7 shows a piezoelectric power generating device 1A according to a second embodiment of the present invention. The piezoelectric power generating device 1A comprises a frame 9 fixed to the inner vertical frame part 24 of a sliding door 22, a piezoelectric ceramics member 10 disposed on the lower side of an upper surface 9a of the frame 9, a cushion material 3 for holding the piezoelectric ceramics member 10 under a soft state in which the natural oscillation of the piezoelectric ceramics member 10 is hardly transmitted to other structural members, a base member 51A formed with an L shaped spring material fixed to a flat surface of the frame 9, vertical elastic members 52A and 52B fixed to a horizontal part 51A1 of the base member 51A and steel balls 53A and 53B as hard striking members respectively fixed to the other end parts of the vertical elastic members 52A and 52B. When external force F is exerted on the steel ball 53B by the above-described operating member 28, the other steel ball 53A continuously repeats right and left oscillations due to a resonance action. The steel ball 53A strikes the piezoelectric ceramics member 10 to apply an impact to the piezoelectric ceramics member 10 and generate power. In the second embodiment, since composition part similar to the first embodiment are designated by the same reference numerals as the first embodiment, the detailed description thereof is omitted.

That is, the vertical elastic members 52A and 52B formed with metal members such as rod shaped stainless steel are welded and fixed with the same length $l_1$ and $l_2$ from a position of width $l_0$ from the right end part of the horizontal part 51A1 of the base member 51A.

Here, when the steel balls 53A and 53B shown in FIG. 7 are respectively formed with a steel ball of 0.6 g, the vertical elastic members 52A and 52B are respectively formed with a stainless steel rod material (sus304-WPB) having $\phi$ of 0.6, the length between $l_1$ and $l_2$ is set to 70 mm and the demension of $l_0$ of the base member 51A formed with a stainless steel material (sus301: t=0.4) is set to 15 mm, the right and left amplitude stroke of the steel balls 53A and 53B was 14 to 15 mm. As a quantity of generated energy by the piezoelectric power generating device 1A having the above-described structure, voltage was measured by the same measuring device as that shown in FIG. 5. Results thereof are shown in FIG. 8.

Figure 8:
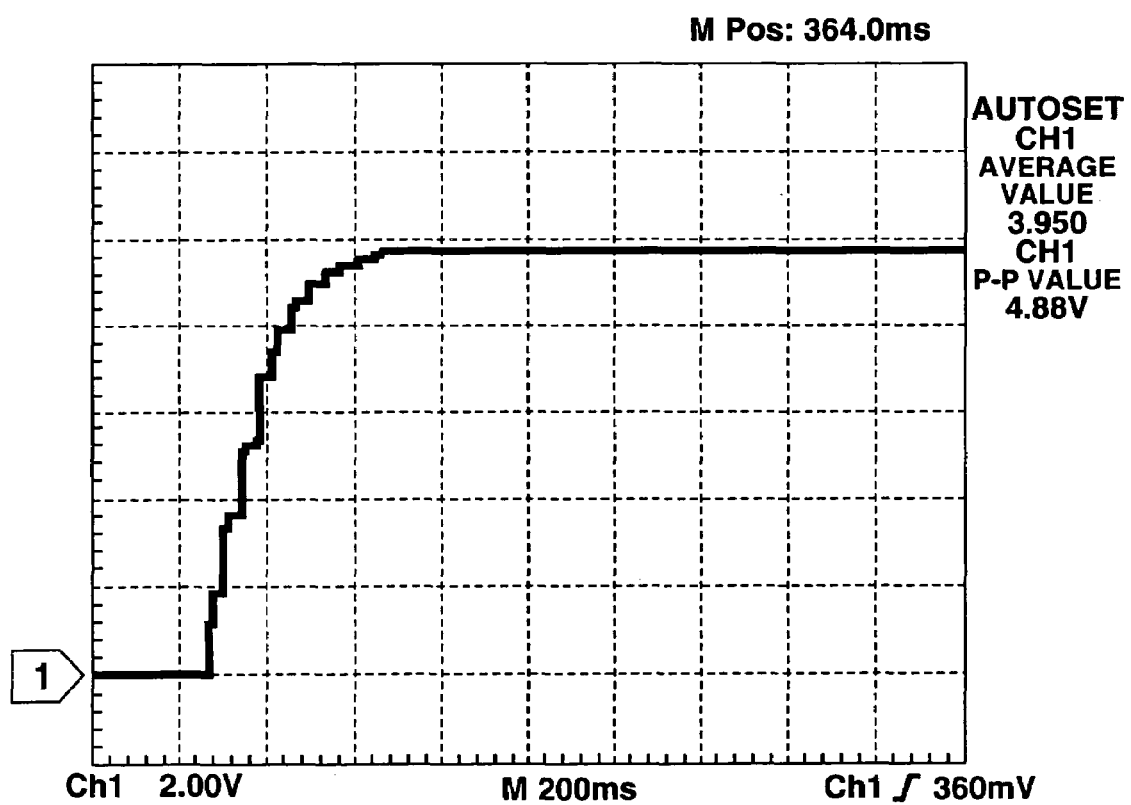
FIG. 8 is a graph showing a quantity of generated energy of another piezoelectric power generating device measured by a measuring circuit similar to the measuring circuit shown in FIG. 5.

As apparent from data shown in FIG. 8, when the external force F is exerted on the steel ball 53B once, the steel ball 53A continuously repeats oscillations rightward and leftward to obtain a power generation not lower than several ten times as high as a quantity of generated energy obtained by a striking operation for only once as usual. Specifically, in this embodiment 3, $l_1$ is set to be equal to $l_2$, 53A is set to be equal to 53B and the natural oscillation of a lower side in FIG. 7 is set to be the same as the natural oscillation of an upper side so that the upper side resonates with the lower side. With such a construction, the natural frequency (n·fo) of the lower side can be set to be integer times as high as the natural frequency (fo) of the upper side. As a result, the stored energy of the upper side is increased (moment of inertia is increased). Thus, the natural frequency is lowered to lengthen an oscillation keeping time of the steel ball 53A.

In the piezoelectric power generating device 1A according to the second embodiment, the number of parts is more greatly reduced than that of the device of the first embodiment. Thus, cost can be decreased and the device can be more extremely made compact. Especially, a practicability is greatly anticipated as a power source requiring a relatively large quantity of electric power.

In the second embodiment, a case that the vertical elastic members 52A and 52B are connected to the base member 51A by welding is described as an example, however, the present invention is not limited thereto. The elastic members may be connected integrally to the base member by known means such as screwing, caulking, or the use of a strong adhesive or soldering.

Further, in each of the embodiment, a case that the piezoelectric power generating device according to the present invention is attached to the crescent lock 20 for monitoring the opening and closing of the window W to form the monitor device is described as an example. However, the present invention is not limited thereto and the present invention may be applied various kinds of security devices for monitoring whether the door of a building is opened or closed, whether a person enters or exits from a building or a room, or whether a vehicle parks in or leaves from a parking place.

INDUSTRIAL APPLICABILITY

Effects as described below are obtained from the non-power source type monitor device according to the present invention.

The invention defined in claim 1 concerns a non-power source type monitor device in a non-power source type security device in which a power of the security device for monitoring whether the door or the window of a building is opened or closed, whether a person enters or exits from a building or a room, or whether a vehicle parks in or leaves from a parking place is supplied by a piezoelectric power generating device using a piezoelectric ceramics member. The piezoelectric power generating device generates power by applying a distortion deformation to the piezoelectric ceramics member. The piezoelectric power generating device comprises: a pair of piezoelectric ceramics members; a cushion material for holding each of the piezoelectric ceramics members under a soft state in which the natural oscillation of each piezoelectric ceramics member is hardly transmitted to other structural members; a pendulum member oscillating through one elastic member in accordance with an excitation; a pair of the other elastic members fixed to both the ends of the one elastic member and extending in a direction perpendicular to the one elastic member; and hard striking members respectively fixed to the end parts of the pair of the other elastic members to alternately strike the pair of the piezoelectric ceramics members and apply an impact respectively to the piezoelectric ceramics members. During the oscillation of the pendulum member, a striking operation that one striking member of the pair of the striking members strikes one piezoelectric ceramics member of the pair of the piezoelectric ceramics members and a separating operation that the other striking member of the pair of the striking members is separated from the other piezoelectric ceramics member of the pair of the piezoelectric ceramics members are continuously alternately repeated to continuously generate power. Thus, a quantity of generated energy not lower than several ten times as much as an output of electric current obtained by a usual piezoelectric power generating device using steel balls can be assuredly obtained in accordance with the alternately and continuously repeated striking operations of the respective striking members due to the excitation of the pendulum member for once. Means capable of automatically repeatedly obtaining the excitation of the pendulum member is commonly used so that the quantity of generated energy of a practical level can be effectively assuredly ensured as power sources of various kinds of monitor devices disposed in places in which power sources are hardly ensured.

According to the invention defined in either claim 2 or claim 3, the striking force of the striking members can be respectively alternately, continuously and repeatedly obtained by a simple and inexpensive mechanism. A power generation of a practical level can be effectively obtained as a power source of a device such as a monitor device that relatively requires electric power and the monitor device of this type can be accurately operated.

The invention defined in claim 4 concerns a non-power source type monitor device in a non-power source type security device in which a power of the security device for monitoring whether the door or the window of a building is opened or closed, whether a person enters or exits from a building or a room, or whether a vehicle parks in or leaves from a parking place is supplied by a piezoelectric power generating device using a piezoelectric ceramics member. The piezoelectric power generating device generates power by applying a distortion deformation to the piezoelectric ceramics member. The piezoelectric power generating device comprises: at least one piezoelectric ceramics member; a cushion material for holding the piezoelectric ceramics member under a soft state in which the natural oscillation of the piezoelectric ceramics member is hardly transmitted to other structural members; a base member made of a spring material; a pair of elastic members fixed to the vertical part of the base member; and hard striking members respectively fixed to both the end parts of the pair of the elastic members to strike the piezoelectric ceramics member and apply an impact to the piezoelectric ceramic member. An external force is exerted on one of the striking members so that the other striking member continuously repeats a vertical oscillation due to a resonance operation. Thus, a quantity of generated energy not lower than several ten times as much as an output of electric current obtained by a usual piezoelectric power generating device using steel balls can be assuredly obtained, because the continuous striking operations of the striking members to the piezoelectric ceramics member are repeated by a resonance action due to the exertion of an external force for once. Further, the quantity of generated energy of a practical level can be effectively, inexpensively and more compactly ensured as power sources of various kinds of monitor devices disposed in places in which power sources are hardly ensured.

According to the invention defined in either claim 5 or claim 6, the striking force of the striking members is respectively continuously and repeatedly obtained in a simple and compact device by a simple and inexpensive mechanism. A power generation of a practical level can be effectively obtained as a power source of this kind of compact monitor device that relatively requires electric power.

The invention claimed is:

1. A non-power source type monitor device in a non-power source type security device in which a power of the security device for monitoring whether the door or the window of a building is opened or closed, whether a person enters or exits from a building or a room, or whether a vehicle parks in or leaves from a parking place is supplied by a piezoelectric power generating device using a piezoelectric ceramics member, said piezoelectric power generating device generating power by applying a distortion deformation to the piezoelectric ceramics member, said piezoelectric power generating device comprising:
a pair of piezoelectric ceramics members;
a cushion material for holding each of the piezoelectric ceramics members under a soft state in which the natural oscillation of each piezoelectric ceramics member is hardly transmitted to other structural members;
a pendulum member oscillating through one elastic member in accordance with an excitation;
a pair of the other elastic members fixed to both the ends of the one elastic member and extending in a direction perpendicular to the one elastic member; and
hard striking members respectively fixed to the end parts of the pair of the other elastic members to alternately strike the pair of the piezoelectric ceramics members and apply an impact respectively to the piezoelectric ceramics members; wherein during the oscillation of the pendulum member, a striking operation that one striking member of the pair of the striking members strikes one piezoelectric ceramics member of the pair of the piezoelectric ceramics members and a separating operation that the other striking member of the pair of the striking members is separated from the other piezoelectric ceramics member of the pair of the piezoelectric ceramics members are continuously alternately repeated to continuously generate power.

2. The non-power source type monitor device according to claim 1, wherein the one elastic member is made of a rectangular plate shaped leaf spring or a coil spring and the pair of the other elastic members is made of a cylindrical rod spring, a rectangular leaf spring or a coil spring.

3. The non-power source type monitor device according to claim 2, wherein during the oscillation of the pendulum member, the pair of the other elastic members forms an intermittent mechanism for continuously alternately repeating the striking operation and the separating operation of each striking member relative to each piezoelectric ceramics member.

4. A non-power source type monitor device in a non-power source type security device in which a power of the securing device for monitoring whether the door or the window of a building is opened or closed, whether a person enters or exits from a building or a room, or whether a vehicle parks in or leaves from a parking place is supplied by a piezoelectric power generating device using a piezoelectric ceramics member, said piezoelectric power generating device generating power by applying a distortion deformation to the piezoelectric ceramics member, said piezoelectric power generating device comprising:
at least one piezoelectric ceramics member;
a cushion material for holding the piezoelectric ceramics member under a soft state in which the natural oscillation of the piezoelectric ceramics member is hardly transmitted to other structural members;
a base member made of a spring material;
a pair of elastic members fixed to the base member; and
hard striking members respectively fixed to both the end parts of the pair of the elastic members to strike the piezoelectric ceramics member and apply an impact to the piezoelectric ceramic member; wherein an external force is exerted on one of the striking members so that the other striking member continuously repeats a vertical oscillation due to a resonance operation.

5. The non-power source type monitor device according to claim 4, wherein the pair of elastic members has the same length from the base member and is fixed to the base member and the striking members fixed to both the end parts of the base member have substantially the same form and weight.

6. The non-power source type device according to claim 5, wherein the pair of the elastic members are connected integrally to the base member by using any of means of screwing, caulking, an adhesive or welding.

7. The non-power source type device according to claim 4, wherein the pair of the elastic members are connected integrally to the base member by using any of means of screwing, caulking, an adhesive or welding.

* * * * *